US006470239B1

(12) United States Patent
Schultz et al.

(10) Patent No.: US 6,470,239 B1
(45) Date of Patent: Oct. 22, 2002

(54) METHOD FOR MAXIMIZING THROUGHPUT OF A PART IN A CONVEYORIZED THERMAL PROCESSOR

(75) Inventors: Steven Arthur Schultz, Gardena, CA (US); Philip C. Kazmierowicz, Estacada, OR (US)

(73) Assignee: KIC Thermal Profiling, San Diego, CA (US)

( * ) Notice: Subject to any disclaimer, the term of this patent is extended or adjusted under 35 U.S.C. 154(b) by 0 days.

(21) Appl. No.: 09/520,919

(22) Filed: Mar. 8, 2000

Related U.S. Application Data

(63) Continuation of application No. 09/404,572, filed on Sep. 23, 1999.

(51) Int. Cl.[7] .......................... G05B 13/02; G06F 19/00; G05D 23/00
(52) U.S. Cl. ........................ 700/299; 700/209; 700/212; 700/30; 700/33
(58) Field of Search .............................. 700/28–30, 32, 700/33, 121, 207, 209, 212, 210, 211, 299, 300; 228/8, 9, 179.1, 180.1, 262.9; 219/388, 391, 395, 398, 413; 432/121, 122, 128; 374/137, 104, 107

(56) References Cited

U.S. PATENT DOCUMENTS

| | | | |
|---|---|---|---|
| 3,621,213 A | 11/1971 | Jen et al. .................... 117/202 |
| 3,793,717 A | 2/1974 | Degenkolb et al. ........... 29/610 |
| 4,176,554 A | 12/1979 | Kazmierowicz ............ 374/137 |
| 4,242,907 A | 1/1981 | Kazmierowicz ............ 374/113 |
| 4,501,552 A | 2/1985 | Wakamiya .................... 432/49 |
| 4,688,180 A | 8/1987 | Motomiya ................... 700/210 |
| 4,775,542 A | 10/1988 | Manser et al. ............... 426/458 |
| 4,982,347 A | 1/1991 | Rackerby et al. ........... 700/299 |
| 5,003,160 A | 3/1991 | Matsuo et al. .............. 219/494 |
| 5,099,442 A | 3/1992 | Furuta et al. ............... 700/274 |
| 5,282,128 A | * 1/1994 | Braude ........................ 700/28 |
| 5,439,160 A | 8/1995 | Marcantonio ............... 228/102 |
| 5,781,430 A | * 7/1998 | Tsai ............................. 700/28 |
| 5,971,249 A | * 10/1999 | Berkin ........................ 228/102 |
| 6,207,936 B1 | 3/2001 | De Waard et al. .......... 219/497 |
| 6,352,192 B1 | * 3/2002 | Lee et al. .................... 228/102 |

FOREIGN PATENT DOCUMENTS

DE 2311616 9/1973 .................. 364/477

OTHER PUBLICATIONS

G. E. P. Box, et al., "On the Experimental Attainment of Optimum Conditions", *J. Royal Statistical Society*, series B, v. xiii, No. 1, 1951, pp. 1–5.
Jyh–Shing Roger Jang, *Neuro–fuzzy and Soft Computing*, ©1997 Prentice–Hall, pp. 156–193.
Germund Dahlquist, et al., *Numerical Methods*, ©1974 Prentice–Hall, pp. 438–441.
Berc Rustem, *Algorithms for Nonlinear Programming and Multiple–Objective Decisions*, ©1998 John Wiley, pp. 59–63, 267–269.
Donald A. Pierre, *Optimization Theory with Applications*, ©1969 Dover, pp. 296–319.
William T. Press, et al., *Numerical Recipies in Fortran 2/e*, ©1992 Cambridge, pp. 402–409, 413–417.
Ernest L. Hall, *Computer Image Processing and Recognition*, ©1979, Academic, pp. 202–205.
Joel H. Ferziger, *Numerical Methods for Engineering Applications 2/e*, ©1998, John Wiley, pp. 283–285.
Saunders Technology, Inc., "Profile Wizard™", 1999, 2 pages.

*Primary Examiner*—Leo Picard
*Assistant Examiner*—Ryan Jarrett
(74) *Attorney, Agent, or Firm*—Thelen Reid & Priest LLP; David B. Ritchie

(57) ABSTRACT

A method for maximizing throughput for thermal processing of a part searches for the maximum conveyor speed while calculating a Process Window Index that is less than a required value. The best Process Window Index associated with the maximum conveyor speed corresponds to a maximum throughput control series with which to set the control parameters of the thermal processor.

16 Claims, 5 Drawing Sheets

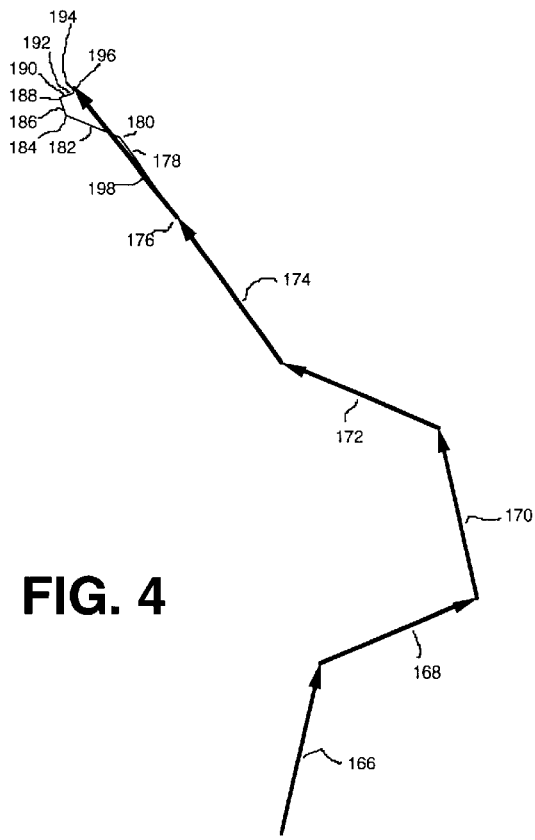
FIG. 4
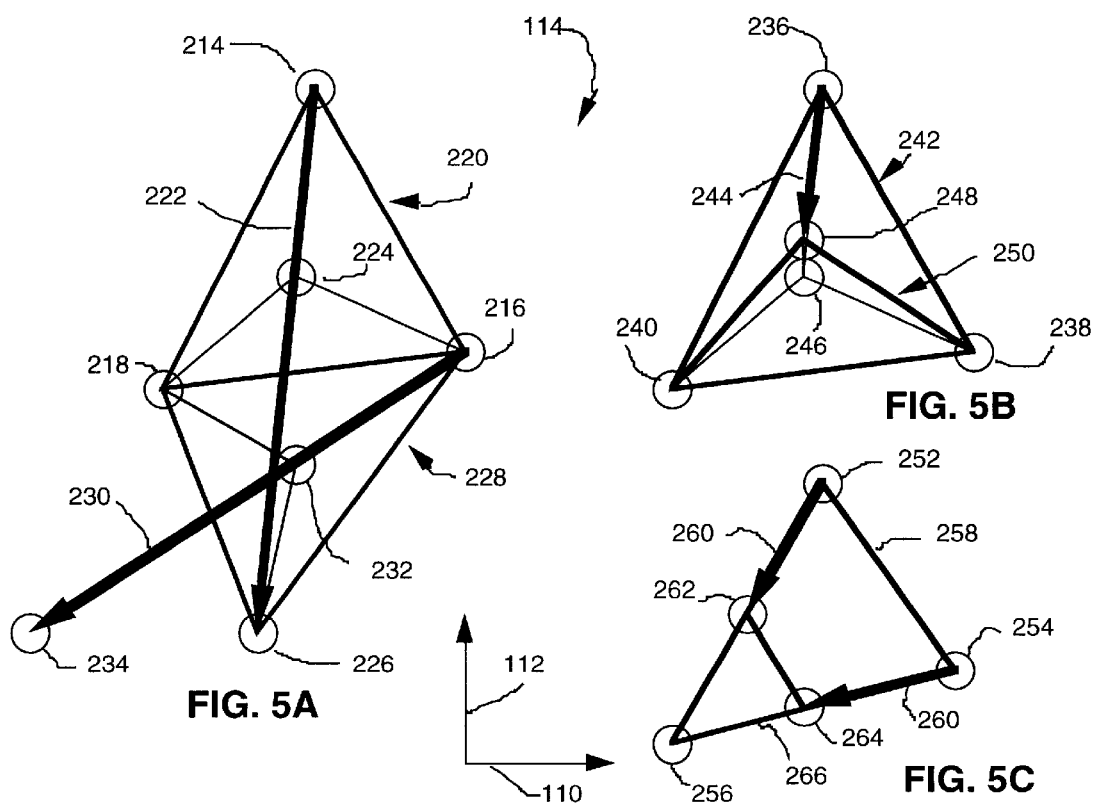
FIG. 5A
FIG. 5B
FIG. 5C

METHOD FOR MAXIMIZING THROUGHPUT OF A PART IN A CONVEYORIZED THERMAL PROCESSOR

CROSS REFERENCE TO RELATED APPLICATION

This application is a Continuation-In-Part of co-pending application Ser. No. 09/404,572 filed on Sep. 23, 1999 entitled "Method and Apparatus for Optimizing Control of a Part Temperature in a Conveyorized Thermal Processor", and with the name of inventors Steven Arthur Schultz and Philip C. Kazmierowicz commonly assigned to KIC Thermal Profiling.

FIELD OF THE INVENTION

The present invention relates to an improved method for maximizing throughput for a part being processed in a conveyorized thermal processor.

BACKGROUND OF THE INVENTION

Thermal processing involves a series of procedures by which an item is exposed to a temperature-controlled environment, and is used in a variety of manufacturing procedures such as heat treating, quenching and refrigerated storage. One example of a thermal processor is a reflow oven. The production of various goods such as electronic circuit boards in solder reflow ovens frequently entails carefully controlled exposure to heating and/or cooling for specific periods of time. The elevated temperature conditions needed to solder component leads onto printed circuit boards must be gradually and uniformly applied to minimize thermal expansion stresses. For this reason, convection heat transfer may be employed in these solder "reflow" operations. The connecting solder paste incorporates an amalgam of substances that must undergo phase changes at separate temperature levels. Solder reflow is performed by sequentially passing a part (such as a printed circuit board product) through a series of thermally isolated adjacent regions or "zones" in the reflow oven, the temperature of each being independently controlled.

Convection heat transfer chambers or zones are typically set to a fixed control temperature throughout a thermal process. A zone may have one or more controlled thermal elements, these each having at least one corresponding control monitoring location. A thermal element may be defined as either a heat source for heating or a heat sink for cooling and is commanded to a control temperature. The temperatures commanded at the control monitoring locations form a "control temperature profile" along the reflow oven. The temperature exposure of the part is governed by the processor temperature of the air in each zone and the exposure time within each region. The temperature of the air along the zones forms a "processor temperature profile". The series of instantaneous part temperature values as the part travels along the conveyor and through the oven may be called a "part temperature profile" and if based on measured data may be called a "measured part temperature profile". The temperature response of the part must satisfy a manufacturer's specification requirements, which include allowable tolerance bands or tolerance limits around target values. A measured value within the corresponding tolerance limit satisfies the specification. The procedure for operating the oven to obtain temperature data (used in creating a measured part temperature profile) may be called a "test process".

The temperature response of the part may be monitored by instrumenting the part or adjacent device with one or more thermocouples (or other temperature measuring contact devices such as thermisters or resistance temperature detectors) prior to sending the part into the reflow oven or by remote observation with a thermal sensor. Alternatively, the temperature response of the part may be measured by a remote means such as an infrared or optical scanner. The thermocouple measurements can be sent to a data acquisition device through an attached cable or by a radio transmitter or by similar means. The temperature adjacent the part (for example, along the conveyor) may also be measured by different means. Two examples are a probe having at least one thermocouple conveyed so as to move along with the part, and a fixed probe extending along the length of the oven and positioned adjacent to the conveyor having a plurality of thermocouples disposed along the probe interior.

A thermal processor, such as a reflow oven, may be modulated by a series of n control parameters labeled $C_j$ numbering from j=1, ..., n. These control parameters may include the oven setpoint temperature at each zone, the conveyor speed, or a combination of these and other variables subject to direct adjustment or indirect influence during the thermal processor operation. Other physical influences on the thermal process include initial conditions, which may depend on the ambient temperature and humidity, as well as characteristics difficult to measure directly, such as convection rate.

A side view diagram of a reflow oven is shown in FIG. 1 as an example of a thermal processor. The reflow oven 10 may have a conveyor 12 aligned along the length of the oven 10 that moves in the direction towards the right from entrance 14 to exit 16. The oven interior may be divided into two or more zones for thermal processing. In the illustration, first and second zones 18a and 18b are shown. Each zone has at least one heating and/or cooling element 20a and 20b and may feature one or more monitoring instruments 22a and 22b in proximity to the elements to monitor thermal processing. These element monitoring instruments 22a and 22b may be thermocouples or thermostats. The oven 10 may also include one or more recirculation fans 24 to increase convection. The conveyor 12 is moved by means of a conveyor motor 26a; the fan is rotated by means of a fan motor 26b. The settings for heating and/or cooling elements 20a and 20b, and the motors 26a and 26b are controlled by a control station 28, which receives settings input from a receiver 30 instructed by an operator 32 or other means. Each control parameter is commanded to a target condition at a control interface between the input receiver 30 and the control parameter. The example shown in FIG. 1 features a first zone interface 34a, a second zone interface 34b, a conveyor interface 34c and a fan control 34d. These control parameters may be expressed as C values in a series of n dimensions where each control parameter is identified as one of $C_1, C_2, \ldots, C_n$ or as $C_j$ where j=1, ..., n and may be identified as a control series. In the example shown in FIG. 1, n equals four. Measured data from instruments monitoring control performance such as element monitoring instruments 22a and 22b may be received by a data acquisition device 36a and recorded on a storage medium 36b.

A part 38, such as a printed circuit board, may be placed on the conveyor 12 upstream of the oven entry 14 to be transported through the oven 10 and egressing through the exit 16. The time-varying thermal exposure may be obtained by using a series of adjacent first and second zones 18a and 18b at a conveyor speed such that part location in the oven 10 may be defined by conveyor speed multiplied by time since entry. The Temperature of the part 38 may be monitored remotely by an infrared or optical scanner or else measured conductively by one or more attached thermal sensors such as a thermocouple 40. The measured part temperature data from the thermocouple 40 may be transmitted to the data acquisition device 36a, either by direct connection or broadcast signal, and recorded on storage medium 36b.

The measured part temperature data by thermocouple 40 may be compared to the specification ranges to determine whether the control commanded values from the control station 28 produce a part temperature that complies with specification. The specification ranges represent the allowable limits for calculated feedback parameters that are selected to characterize the thermal process for the part. These feedback parameters may be written as B values in a series of m dimensions where each feedback parameter is identified as one of $B_1, B_2, \ldots B_m$, or as $B_i$ where $i=1, \ldots, m$. The amount by which a measured value deviates from the middle of its specification range corresponds to a feedback index, and the maximum of these feedback indices denotes the Process Window Index, S, for that thermal process.

Temperature variation may be compared along the reflow oven's length between the commanded temperatures for the elements, the measured zone temperatures, the measured temperature response for the part and the corresponding specification range for the part. A graph illustrating temperature along the conveyor path is shown in FIG. 2. The temperature scale forming the ordinate 50 is plotted against the abscissa 52 or distance axis along the conveyor path. The first zone 54a and second zone 54b encompasses a spatial region across a portion of the oven distance 52. The control temperature levels for each zone region can be appended to form a control profile 56 that is piece-wise continuous along the distance axis 52. Processor temperatures measured (or otherwise determined) near the thermal elements form a processor profile 58. The processor temperature in processor profile 58 often deviates from the control temperature in control profile 56 by a small quantity under convective heat transfer due to cross flow between zones and other physical effects.

The part exhibits a temperature response based on temperature measurements over time along the oven length. This response may be plotted as a part profile 60 along the distance axis 52 by multiplying the conveyor speed by the time from the part's entry into the oven. Air (the heat transfer medium in the oven) has a relatively low thermal conductivity (compared to the part) with which to convect heat from thermal elements to the part surface. Due to the low convection and the part's internal heat capacity by virtue of its mass, the part response temperature along part profile 60 will lag the control temperature 56 set in the zone region to which the part is exposed.

The part temperature profile 60 may be evaluated for particular characteristics earlier referred to as feedback parameters related to the thermal process specification. For example, the maximum temperature rise rate 62 may be determined from a discrete temperature increase 62a over a selected time interval 62b, preferably when the temperature increases relatively steadily for the selected time interval 62b. Additionally, the peak part temperature 64 may be determined by the highest measured temperature along the part temperature profile 60. Similarly, "time above reflow" may be ascertained as a reflow time interval 66 by establishing the time period when the part temperature profile 60 exceeds the reflow temperature level 66a beginning at the initial time 66b and ending at final time 66c. These feedback parameter values may be compared to specified ranges that the profile must be within in order to have been properly thermally processed. The maximum temperature rise rate 62 may be compared to the rise rate range, featuring a minimum acceptable rate 68a and a maximum acceptable range 68b. The peak part temperature 64 may be compared to the peak range bounded by a minimum accepted peak temperature 70a and a maximum accepted temperature 70b. Similarly, the reflow time interval 66 may be compared to the reflow time range, with a minimum accepted period 72a and a maximum accepted period 72b. The closer the feedback parameters conform to the middle of the ranges, the smaller its feedback index, the maximum of which yields the Process Window Index, described in more detail below.

Typically in the past, the test procedure for a reflow thermal process involved having an operator set the oven controls, allow sufficient time for the processor temperatures in each zone to reach thermal equilibrium, set the conveyor speed, and send an instrumented part through the oven. Thermal equilibrium is defined as a steady-state condition in which the temperature has stabilized and does not change with time. In practice, a small fluctuation within a specified range is allowed. After a comparison between the part's target temperatures and its measured values along the oven length, the operator guesses or estimates changes to the control parameters or the conveyor speed. The operator implements the guess and repeats the process over and over until the temperature difference between target and measurement is reduced to an allowable tolerance. An allowable tolerance constitutes an acceptable deviation from the target temperature profile for the part. The trial and error method can be time consuming and requires an experienced operator to implement.

In an improvement to the earlier procedure, guessing the control adjustment may be replaced with a computer executed algorithm that computes a part temperature difference profile between the target and measured values, and uses this difference profile in another algorithm that provides a series of changes to the control parameters in order to bring the measured part temperature profile closer to its target temperature profile. By successive iteration, control parameters to achieve allowable tolerances may be established within two to five attempts—more quickly than through trial and error. The algorithms used in that method, however, require knowledge of the material properties of the board along with information on the nature of air current within the zone, limiting the method's practicality and complicating its implementation.

Process Window Index

In an improvement to the earlier procedure, a feedback mechanism may be included which compares measurement-based data against a series of specified tolerances to indicate whether the part temperature responses satisfy the required conditions imposed by the part manufacturer. The numerical sign for whether the required conditions are satisfied may be called the Process Window Index, which represents a non-dimensional measure of a part temperature profile to identify whether that profile satisfies the specification imposed by manufacturing requirements. It provides the operator a quantitative indicator of whether the control parameters require adjustment for production-mode thermal processing.

The Process Window Index, S, is a nondimensional positive real number described by a series of measured or measurement-derived parameters $B_i$ numbering from $i=1, \ldots, m$ each compared to its tolerance band that the value for $B_i$ must be within to satisfy the required conditions. These measured or measurement-derived parameters, which are hereafter called calculated feedback parameters, form a plurality of data values. One example of a measured parameter for $B_i$ is a peak temperature of the part $T_p^{peak}$ as it moves along the conveyor in the reflow oven. A peak temperature on a part is measured on at least one location on the part, and typically a plurality of temperatures may be obtained at different locations on the part in order to monitor the spatial nonuniformity of the part's transient response.

An example of a measurement-derived parameter for $B_i$ would be a maximum of part temperature change with respect to time which is called part temperature change rate labeled as $\partial T_p/\partial t$. (The "$\partial$" sign represents the partial derivative in differential equations.) Such a quantity is not directly measured, but may be found in discretized form by subtracting part temperature measured at two separate times and dividing by the elapsed time between the measurements. The part temperature change rate is typically monitored to minimize the risks of physical distortion of the part and maximize production throughput, and thus represents an important parameter to monitor. A second example of a measured-derived parameter used in electronics thermal processing applications is the "time above reflow" $t_{ar}$: ($T_p \geq T_{liq}$) meaning the period during which the part temperature has reached or exceeded the solder liquefaction temperature. This time above reflow may be monitored so as to better enable adequate liquification of the solder for a proper electrical connection between the printed circuit board and its mounted components, without damaging that board from excessive exposure to elevated temperatures.

The tolerance band may be described by its maximum and minimum values. The Process Window Index represents the largest excursion relative to the tolerance bands from the series of calculated feedback parameters. An expression for the Process Window Index S may thus be shown as equation (1):

$$S = \max\{|(B_i - \beta^+_i)|/\beta^-_i \forall i = 1, \ldots, m\} \quad (1)$$

where $\beta^+_i = (B_{imax} + B_{imin})/2$ or the midpoint within the tolerance band and $\beta^-_i = (B_{imax} - B_{imin})/2$ or the allowed excursion from the midpoint. (The symbol $\forall$ means "for all".) The values $B_{imax}$ and $B_{imin}$ represent the maximum and minimum limits within the tolerance band from the target value (typically the midpoint $\beta^+_i$) for the feedback parameters $B_i$. The Process Window Index is the maximum normalized absolute value of the deviation with respect to the tolerance bands of all feedback parameters, and when displayed is multiplied by one-hundred to provide a percentage value for the amount of tolerance "window" that is taken in the test process. This represents the typical form by which the Process Window Index is provided to the operator. In order to satisfy the specification requirements, the percentage yielding Process Window Index in this percentage form should have a value of less than one-hundred.

In the procedure to obtain the Process Window Index, calculated feedback parameters are compared in the above-described normalized form, and include parameters such as peak rise rate in the part temperature profile, time period that the part temperature profile is within a specified temperature range, and part temperature profile peak value within the reflow oven. Individual parameters may represent the dominant characteristic in local portions of the reflow oven. For example, part temperature rise rate generally reaches its peak in the initial zones, since the temperature difference between the part initially at room temperature and the first reflow oven zones that the part encounters is often higher than the temperature difference between the partially heated part and the subsequent elevated control temperature zones.

The peak value of part temperature may be typically attained towards the end of the reflow process where the control temperature setting is highest.

Examination of the Process Window Index enables an operator to determine whether adjustment of the control parameters for the thermal process may be required. However, the solutions to improve the Process Window Index towards a lower value need not be unique, and so the operator must choose from several options, often based on arbitrary criteria. In addition, when the number of control parameters $C_j$ where $j = 1, \ldots, n$ exceeds a certain value, such as $n > 4$, the multitude of potential solutions becomes too great to practicably sort for the most appropriate selection.

While the Process Window Index provides feedback by which to adjust control parameters, no method or mechanism is available to provide mathematically efficient correlation between changes in control parameters and effect on feedback parameters to indicate specification compliance for the selected control parameters. Such a development would greatly expedite the production of parts in a thermal processor by eliminating trial and error to adjust the control parameters.

SUMMARY OF THE INVENTION

A method for maximizing throughput for thermal processing of a part searches for the maximum conveyor speed while calculating a Process Window Index that is less than a required value. The best Process Window Index associated with the maximum conveyor speed corresponds to a maximum throughput control series with which to set the control parameters of the thermal processor.

BRIEF DESCRIPTION OF THE FIGURES

FIG. 4 is a diagram illustrating a method of finding a Process Window Index vector using a weighted history of previous vectors using damped Cauchy's Method of Steepest Descent in accordance with an alternate embodiment of the present invention.

FIG. 5A is a diagram illustrating a method to find a vector using Downhill Simplex Method with reflection in accordance with an alternate embodiment of the present invention.

FIG. 5B is a diagram illustrating a method to find a vector using Downhill Simplex Method with contraction in accordance with an alternate embodiment of the present invention.

FIG. 5C is a diagram illustrating a method to find a vector using Downhill Simplex Method with shrinkage in accordance with an alternate embodiment of the present invention.

DETAILED DESCRIPTION OF THE PREFERRED EMBODIMENTS

Figure 1:
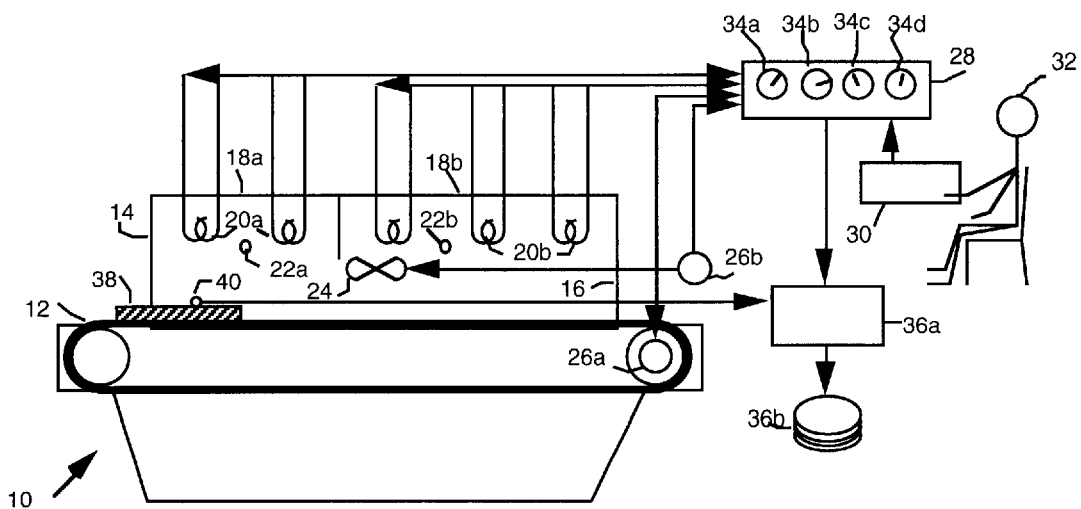
FIG. 1 is a side-view diagram of a conventional reflow oven, showing the direction of travel for an item to be heated and the different zones to which the item is exposed.
Figure 2:
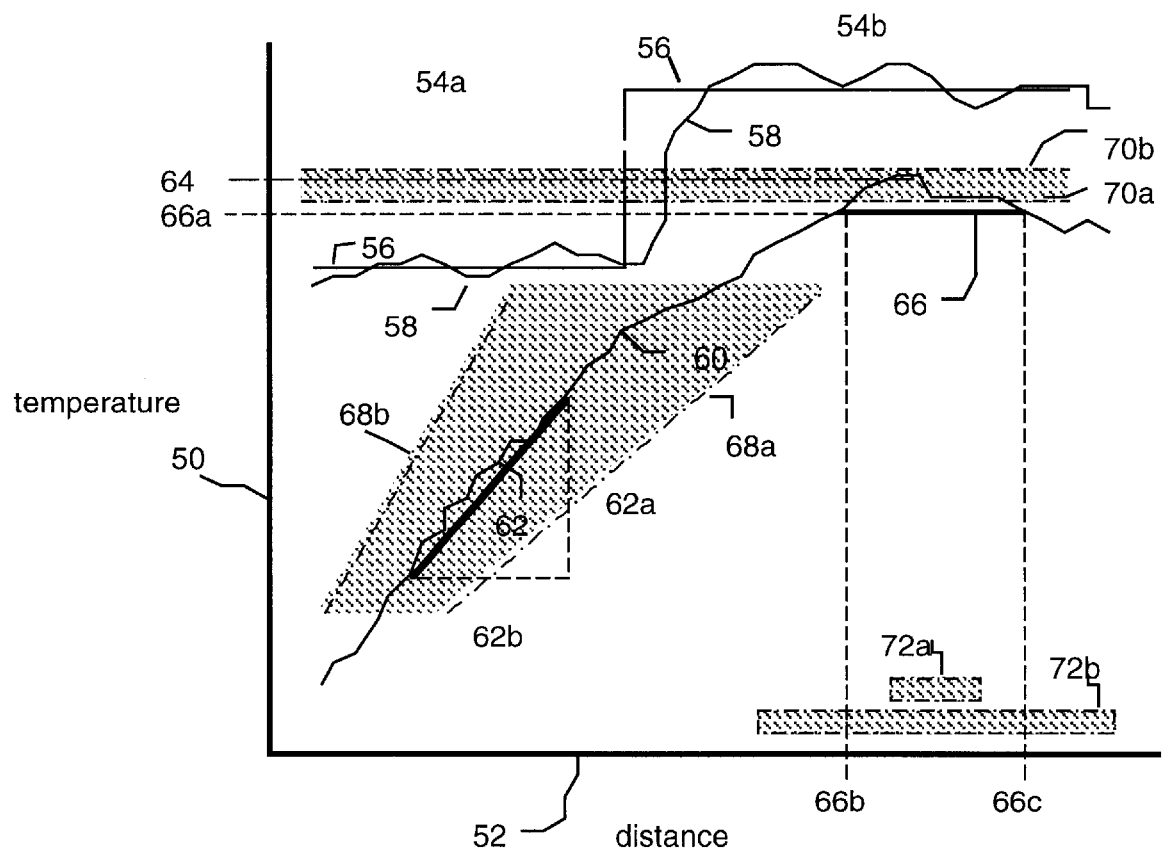
FIG. 2 is a graph showing temperature variations against distance along the thermal processor.

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith.

Optimization

The present invention is a method to control the temperature profile of a part conveyed through a thermal processor for maximum throughput. This may be accomplished by optimizing response characteristics for maximum conveyor speed (as one of the control parameters) and then using the values for the control parameters that correspond to the optimized response characteristics for controlling the thermal processor. The measured part temperature profile may be compared to its manufacturer's required specification, and, by selecting control parameters based on optimized parameters, the part temperature profile can be made to conform to the specification with the greatest margin of error so as to best compensate for fluctuations in the thermal processor responses to the control parameters. By finding an optimum set of control parameters through an automation method, the arbitrary selection of control adjustments to improve thermal processing may be eliminated.

In this disclosure, the term Process Window Index, S, is used to describe an index value denominated in percentage of a "process window" for the maximum feedback parameter deviation from the specification tolerance. Similar index values ultimately based upon the same control parameters could also be used. Those of ordinary skill in the art will recognize therefore that the term Process Window Index as used herein is intended to include similar indices, however denominated or limited by applicable range.

Changes in the control parameters affect the calculated feedback parameters, and may thereby alter the Process Window Index value by either increasing the largest normalized deviation from the feedback parameter midpoint, or by changing another feedback parameter to produce a larger deviation than the previous maximum feedback deviation. It is possible to find relations between control parameters and feedback parameters by using "influence coefficients" that correlate change in the control parameters as independent variables to the change in feedback parameters as dependent variables. A control parameter that is adjusted based on the feedback parameters could use these influence coefficients as in Taylor series or other normalized form for changes from a reference control parameter series as expressed in the following equation (2):

$$B_i = B_i^0 + \Sigma_j a_{ij}(C_j - C_j^0) + \Sigma_{j,k} b_{ijk}(C_j - C_j^0)(C_k - C_k^0) + \ldots \} \forall i=1, \ldots, m; \quad j,k=1, \ldots, n \quad (2)$$

where $B_i$ represent the feedback parameters ranging from a series ranging from $i=1, \ldots, m$, $C_j$ and $C_k$ are the selected control parameters from a series ranging from $j,k=1, \ldots, n$, coefficients $a_{ij} = \partial B_i/\partial C_j$ as the first order derivative, $b_{ijk} = \partial^2 B_i/\partial C_j \partial C_k$ as the second order coefficient, ellipses are higher order terms, and superscript 0 denotes the reference conditions from which control changes are made. Due to both measurement uncertainty and combinatorially exploding complexity, the second and higher order terms are generally neglected yielding a simplified approximation expressed as equation (3):

$$B_i \approx B_i^0 + \Sigma_j a_{ij}(C_j - C_j^0) \} \Sigma i=1, \ldots, m; j=1, \ldots, n = B_i^0 + a_{i1}(C_1 - C_1^0) + a_{i2}(C_2 - C_2^0) + \ldots + a_{in}(C_n - C_n^0) \} \forall i=1, \ldots, m \quad (3)$$

where the change in a feedback parameter is determined by the first order derivatives that can be expressed as a summation series from $1, \ldots, n$ control parameters differences. Thus, the feedback parameters can be approximated from the $a_{ij}$ coefficients for several iterations sequentially in the following algorithms, or, alternately, they can be calculated explicitly for each iteration.

The coefficients $a_{ij}$ as first order derivatives of calculated feedback parameters with respect to control parameters $C_j$ might be obtained by collecting a set of feedback values $B_i$ ($i=1, 2, \ldots, m$). As a simplified example, the number of control parameters may be $n=4$, and the number of feedback parameters to be evaluated may be $m=3$ for a reference and an adjusted set of conditions (or alternatively a first and second set of conditions) of the control parameter to be varied. Control parameters might in this example correspond to first, control temperature for the first zone as $C_1 = T_{c1}$; second, control temperature for the second zone as $C_2 = T_{c2}$; third, conveyor speed $C_3 = u$, and fourth, fan angular speed $C_4 = \omega$. The corresponding feedback parameters for the two sets of conditions, whether from a prediction routine or other source, may provide the data with which to obtain the coefficients $a_{ij}$.

The difference in the peak part temperature (the third feedback parameter) may be computed between second and first fan speeds at reference first zone control temperatures, second zone control temperatures and so forth. The difference in the second and first fan speeds (the fourth control parameter) might be similarly computed. Dividing this third feedback difference with this fourth control difference yields the influence coefficient between peak part temperature and fan speed—that is, for $i=3$ and $j=4$. Algebraically, determination of $a_{ij}$ may be expressed using superscript 0 as the reference condition in equation (4):

$$a_{ij} = (B_i - B_i^0)/(C_j - C_j^0) \quad (4)$$

in which for this example, $i=3$ and $j=4$. This process may be repeated for the is third feedback parameter against each other change in control parameters, and for the other feedback parameters against control parameter changes. A table of coefficients $a_{ij}$ may thus be generated for all values of feedback parameters based on all values of control parameters. This table may thus be used for calculating the feedback parameters in the neighborhood of a particular point defined by a unique set of control parameters. This shortcut accelerates the calculation of the Process Window Index in the vicinity of that particular value. After a suitable number of iterations in the subsequently mentioned algorithms, the process of which being a presently preferred embodiment of the invention, the values of $a_{ij}$ could be recalculated based on equation (4) to adjust the table for nonlinear variations in the feedback parameters as functions of the control parameters.

In order to adjust control parameters for the greatest margin of error, a minimum Process Window Index $S_{min}$ must be found for the available thermal processor ranges in control parameters such that the minimum Process Window Index is less than all other values of S and is less than one-hundred in percentage form. The control parameters directly affect thermal process in a reflow oven altering the calculated feedback parameter responses and thereby influence the Process Window Index for a particular thermal process. Hence, the Process Window Index, S, may be represented as the maximum of all functions of the control parameters. This may be expressed in the relation form of equation (5):

$$S=\max\{f(C_j) \forall j=1, 2, \ldots, n\}=\max\{f(C_1), f(C_2), \ldots, f(C_n)\} \quad (5)$$

where the Process Window Index ,S, represents the maximum value of the series of positive general functions f for control parameters $C_j$ from j=1, . . . , n. The set of control parameters evaluated represents a control series.

Response in the Process Window Index to changes in control parameters cannot be as easily characterized as the response in feedback parameters to control parameter changes. The Process Window Index may be defined as a maximum value of a non-negative numerical set. This precludes a general assumption that a derivative of the Process Window Index with a control parameter would be continuous. Changes in the Process Window Index to control parameters may be characterized by discontinuous vector functions $g_j=f'(C_j)=\partial f/\partial C_j$ for j=1, . . . , n. The influence characteristic vector $g_j$ corresponding to descending changes in Process Window Index provides the steepest gradient with which to search the minimum Process Window Index.

Minimization Search Procedure

In order to generate the values of control parameters that correspond to the minimum Process Window Index, a numerical optimization scheme may be employed to find the minimum value for the Process Window Index based on its variation with the corresponding control series. (The alternatives of random guessing and complete mapping of the Process Window Index variation for the control series ranges are time consuming and thereby cost prohibitive.) Several optimization techniques are available, as is known in the art of numerical analysis. Two classes of optimization techniques include line search (along the direction of a line) and step search (using a defined step distance for travel). In the case where the derivatives of the Process Window Index to the control parameters are discontinuous, line search is disfavored since the search may become "trapped" at a localized minimum (or in a rut). In a presently preferred embodiment of the present invention, a step search using a fixed distance across the control series surface (as on a topographical map) is used as a class of optimization techniques, instead of a variable distance such as the magnitude of the gradient. This step length can be varied so as to step out of local minima. In a preferred embodiment of the present invention, the damped Cauchy's Method of Steepest Descent (MSD) procedure (named for the 19th century French mathematician A. L. Cauchy) may be used to step along the negative gradient for approaching the minimum Process Window Index $S_{min}$. In alternate embodiments of the present invention, Cauchy's MSD and/or Downward Simplex Method may be used to obtain these results.

Figure 3:
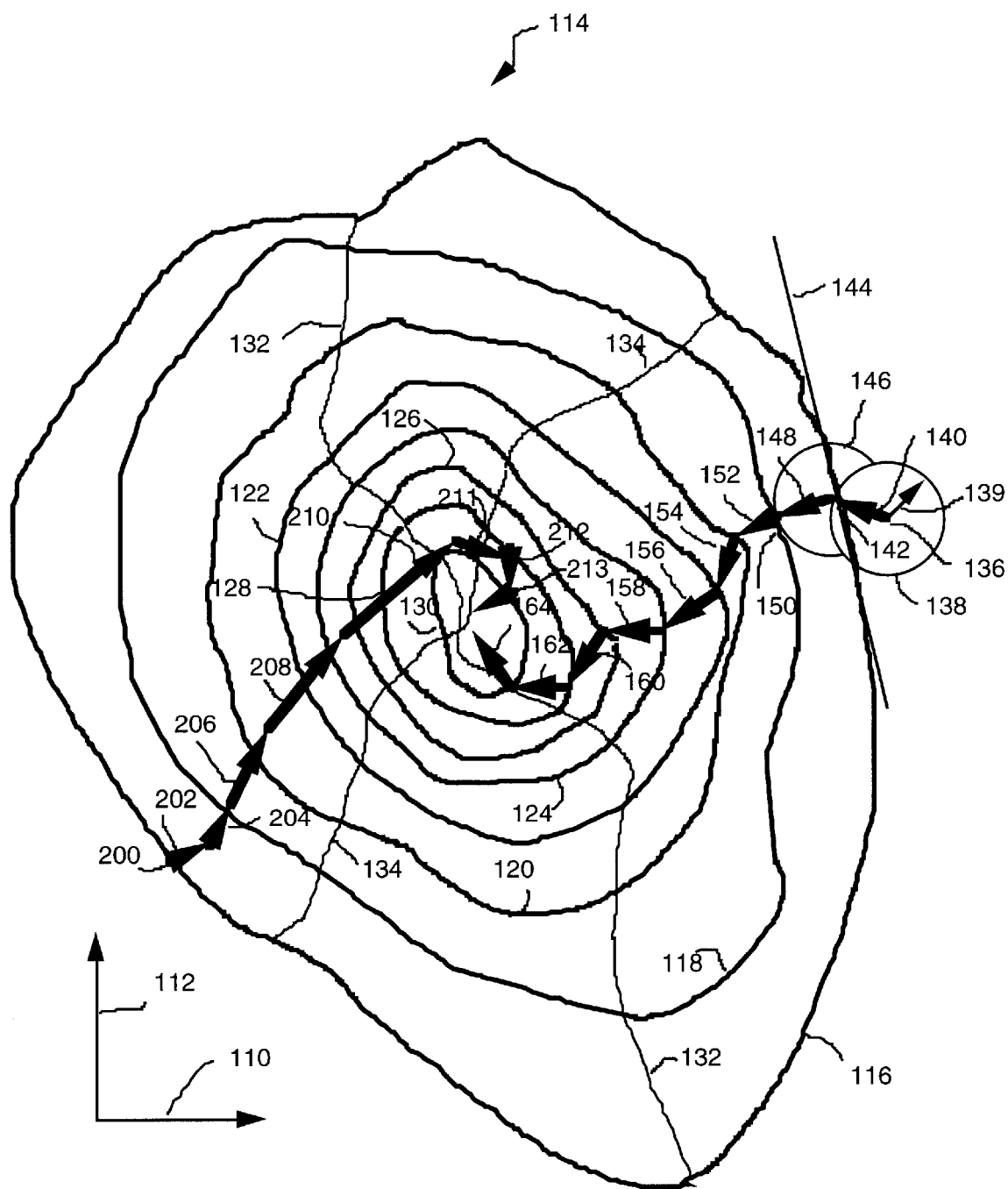
FIG. 3 is a diagram illustrating a method to find a minimum value of a Process Window Index using Cauchy's Method of Steepest Descent and damped Cauchy's Method of Steepest Descent in accordance with two embodiments of the present invention.

FIG. 3 illustrates an example two-dimensional diagram to depict a search within a planar surface of two control parameters by Cauchy's MSD. By a theorem of multivariable calculus the gradient of a function is the direction of steepest descent. The control parameters are directionally represented by the abscissa vector 110 for $C_1$ and the ordinate vector 112 for $C_2$. The example restriction to two control parameters (j=2) is made to facilitate understanding of the illustration, and not a limitation of the invention. A topographical contour map 114 shows a series of concentric rings 116, 118, 120, 122, 124, 126, 128, and 130 (which may be nonuniform) on the surface representing locations where the Process Window Index is constant along a ring. A direction towards a lower valued Process Window Index ring may be deemed inward. Between the rings 116, 118, 120, 122, 124, 126, 128 and 130 may be ridges 132 and 134 at which the absolute vector derivative of feedback parameters to control parameters $g_j=f'(C_j)$ called a gradient may be discontinuous. This slope change may be caused by either alternate feedback parameters $B_i$ approaching or exceeding the tolerance limits at different positions within the reflow oven, and/or particular control parameters $C_j$ gaining dominance over others within localized zones of the reflow oven.

This implementation of Cauchy's MSD step search algorithm uses a line segment of uniform length along the surface for change in the control series. A series of these lines may be generated from point to point in whichever direction selected, which for optimization may be inward. Each line, such as line segment 148, has a start point 142 and an end point 150. Cauchy's MSD finds the largest negative gradient and executes a step in a manner analogous to a person using a stick to step down the steepest slope of a hill in order to locate a lake on a moonless night. By holding the stick at the handle in one hand, such a person may point the stick at the handle in the direction of steepest descent to the endpoint of the stick. By stepping onto this new lower place, the stick may then point in the direction of the negative gradient to its endpoint. This procedure may be continued until the person finds no lower places at a stick's reach from the place stood, which should correspond to the lake's edge assuming the global minimum is found. The fixed step length enables the search algorithm to avoid becoming trapped on ridges or in regions with a local minimum within a distance less than the step length by enabling the search to examine beyond a local horizon analogous to a puddle or a rut. In addition, the step length may be increased if conditions indicate a local minimum has been reached, in order to step beyond the local minimum. On the surface comprising the control series, this searching process continues until the solution converges on the minimum Process Window Index $S_{min}$ available and stops decreasing after several iterations with no improvement of the minimum found.

Returning to FIG. 3, the optimization search begins at a start point 136 with the objective of moving towards a lower Process Window Index by a uniform step size of a certain radius 139 within an arc 138 progressing in the direction of the negative gradient directing a line segment 140 to an endpoint 142 on the edge of ring 116. From endpoint 142, another step within arc 146 can be made in the direction of the negative gradient. The direction for line segment 148 will be perpendicular to the tangent 144 of ring 116 at endpoint 142. The line segment 148 has an endpoint 150 at which another ring 118 is reached. Line segment 152 starts at endpoint 150 perpendicular to ring 118, ending on ring 120. Line segment 154 progresses from ring 120 to ring 122, followed by line segment 156 progressing from ring 122 to ring 124. This process continues for line segments 158, 160, and 162 until line segment 164 at ring 130 beyond which step size exceeds the change along the map 114.

The differences in the Process Window Index between these rings 116, 118, 120, 122, 124, 126, 128 and 130 represent gradients, based on the criteria selected, across which an optimization technique traverses to seek the minimum Process Window Index value. The corresponding control parameters for that minimum Process Window Index are available from input to the function f in the optimization search, and may then be used for the thermal processor control parameters for production processing.

The preferred embodiment uses the damped Cauchy's MSD as explained in more detail below. In an alternate embodiment of the present invention, a substitute step search optimization technique may be employed. Examples of alternate techniques include Cauchy's MSD, univariate search, Southwell's relaxation and the Downhill Simplex Method (DSM).

In damped Cauchy's method of steepest descent, the gradient of the Process Window Index to the control parameters is used to calculate the direction of steepest descent. The control parameters $C_j$ may then be altered by summing the product of a scalar constant times the series of past gradients in the direction of change for each control parameter. In the Fletcher-Reeves algorithm for conjugate gradient method (CGM), the search direction is determined by a ratio of the dot products of the last two gradients considered. Similarly, damped Cauchy's MSD replaces the Fletcher-Reeves ratio of gradients by a scalar constant $\phi$ with a value between one and zero, damping the search direction with a decreasingly weighted history of previous search directions. The search direction $R_k$ is determined by the recurrence relation from the step length coefficient $\rho$, the gradient $G_k$ and the previous search direction $R_{k-1}$, adjusted by scalar $\phi$ by initial and subsequent values of $R_k$ in equation (6):

$$R_0 = -[\rho/|G_0|] \cdot G_0 (k=0); R_k = -[\rho/|G_k|] \cdot G_k + \phi R_{k-1} \tag{6}$$

This procedure reduces walking along derivative discontinuity ridges and accelerates the search along paths of similar gradients. This is a presently preferred embodiment of the present invention.

The damped Cauchy's MSD step direction may be illustrated in the diagram of FIG. 4. A step history of five line vectors of equal segment length is shown on a two-dimensional surface, beginning with the first vector 166, followed by a second vector 168, a third vector 170, a fourth vector 172 and a fifth vector 174, which ends at point 176. Based on lines 166, 168, 170, 172 and 174, a new line direction may be found by first multiplying the latest vector 174 by a scalar of example value 0.6, and projecting this result from point 176 as partial vector 178 ending at point 180. Next, second latest vector 172 may be multiplied by scalar $0.6^2$ (=0.36) and added to point 180 as partial vector 182 ending at point 184. Next third latest vector 170 may be multiplied by $0.6^3$ and added to point 184 as partial vector 186 ending at point 188. This process continues with fourth latest vector 168 multiplied by $0.6^4$ forming partial vector 190 ending at point 192 and fifth latest vector 166 multiplied by $0.6^5$ forming partial vector 194. This forms a direction for vector 198 starting from point 176 ending at point 196, with the segment length being normalized to the same length as for the vectors 166, 168, 170, 172 and 174. An alternative method uses an example value of 0.9 followed by values of $0.6^\kappa$ where $\kappa$ is an increasing integer power starting at unity.

An example of how the damped Cauchy's MSD search vectors behave in contrast to the Cauchy's MSD may be seen in FIG. 3. On the map 114, an initial Process Window Index point 200 represents a starting position relative to two control parameters 112 and 114. The initial vector 202 projects inward, followed by vector 204. The next vector 206 adding the weighted contributions from vectors 202 and 204 extends farther distance inward than the previous vectors 202 and 204. This process of adding weighted vector histories to the subsequent vector continues with vector 208 until the vector 210 overshoots the minimum. The following vectors 211, 212 and 213 add the weighted history contributions with the steepest descent to correct the overshoot to spiral into the minimum Process Window Index.

One method that does not require the use of derivatives is the Downhill Simplex Method (DSM). A simplex is a geometrical figure consisting, in n dimensions, of n+1 points and all their interconnecting line segments. In two dimensions, a simplex is a triangle; in three dimensions it forms a tetrahedron. Generally, DSM restricts a simplex to be non-degenerate—meaning to enclose a finite inner volume in n-dimensional space. The DSM starts out with a simplex of n+1 evaluated Process Window Index points on the n-dimensional space topographical map. The centroid $S_c$ of the simplex is calculated and the point of highest Process Window Index $S^h$ is found which is then exchanged for a new point $S_n$, in the following manner. A reflection point $S_r$ is generated by the equation $S_r = S_c + \alpha \cdot (S_c - S_h)$, where $\alpha$ is a positive scalar constant typically set to unity. Then the Process Window Index at the reflection point $S_r$ is evaluated, and depending on its value, one of the following operations may be performed and the high point $S_h$ may be set to the new replacement point $S_n$:

(a) Expansion: $S_r$ is less than all the Process Window Index points in the simplex. An expansion is performed where the point of expansion is calculated, $S_x = S_c + \gamma \cdot (S_r - S_c)$, where $\gamma$ is a scalar greater than unity (typically equal to two). If $S_x$ is less than all the Process Window Index points in the simplex, the new replacement point, $S_n$ is set equal to expansion point $S_x$. Otherwise the new replacement point $S_n$ is set equal to the reflection point $S_r$ and the reflection process is repeated.

(b) Replace Low: If reflection point $S_r$ is greater than the lowest Process Window Index in the simplex and lower than the next to highest Process Window Index in the simplex, then set new replacement point to the reflection point $S_n = S_r$ and repeat the reflection process.

(c) Replace High: If reflection point $S_r$ is between the two highest Process Window Index points in the simplex, then replace high point with the reflection point $S_h = S_r$ and go to Contraction.

(d) Replace Very High: reflection point $S_r$ is greater than high point $S_h$. Go to Contraction:

(e) Contraction: Set a new replacement point of contraction to $S_n = S_c + \zeta \cdot (S_h - S_c)$, where $\zeta$ is a scalar between 0 and 1 (typically set to 0.5). If $S_n$ is less than $S_h$, repeat process. Otherwise, go to Shrinkage and discard $S_n$.

(f) Shrinkage: Replace each point in the simplex, $S_k$ (for all k=1, . . . , p+1) with an averaging reduction around the lowest valued Process Window Index point in the simplex $S_l$, such that $S_k = (S_k + S_l)/2$, and repeat process. Do not set high point equal to the new replacement point $S_h = S_n$.

The Downhill Simplex Method can be described using the diagrams in FIGS. 5A, 5B and 5C. In the DSM, Process Window Index values for different control series conditions are plotted in FIG. 5A against control series coordinates 110 and 112 on a two-dimensional topographical map 114. Three Process Window Index values plotted as points 214, 216 and 218 form a triangle 220. The point 214 with the highest (least optimum) value is segregated from the two lower points 216 and 218, and a vector 222 is traced from the highest point 214 to the centroid 224 of triangle 220. In reflection and expansion, the vector 222 may have a length of greater than or equal to the distance between point 214 and the centroid 224, ending at point 226. A new triangle 228 is formed between points 216, 218 and 226. The point with the next highest value, point 216 is segregated from points 218 and 226, and a vector 230 is traced from point 216 through the centroid 232 of the triangle 228. The vector 230 ends at point 234, which serves to form the next triangle.

By contrast, in a contraction, the resulting simplex is reduced in volume along one or more directions rather than shifted away from its original space. Turning to FIG. 5B, three Process Window Index values plotted as points 236, 238 and 240 form a triangle 242. The point 236 with the highest (least optimum) value is segregated from the two lower points 238 and 240, and a vector 244 is traced from the highest point 236 along the line leading to the centroid 246 of triangle 242, leading to the new point 248. A new triangle 250 is thus formed from points 248, 238 and 240. This reflection and/or contraction process continues until the simplex points have values that differ only by a specified tolerance. A shrinkage can also be visualized in FIG. 5C with three Process Window Index values plotted as points 252, 254 and 256 forming a triangle 258, with point 256 having the lowest value. The vectors 260 focus from points 252 and 254 along the vertices of the triangle 258 halfway towards the lowest point 256 ending at points 262 and 264 to form a new triangle 266.

Alternative embodiments of the present invention use univariate search and Southwell's relaxation method for optimizing the Process Window Index. The univariate search iterates by varying each of the control parameters sequentially to determine the decreasing Process Window Index. After all control parameter variables have been incrementally adjusted or tweaked to produce a minimum along their range, the first variable is adjusted anew and the iteration process repeats itself. While not computationally or memory intensive, a univariate search requires multiple iterations at each interval to find a minimum, and may be vulnerable to being caught in a local minimum rather than the global minimum.

Southwell's relaxation method is similar to the univariate search except that the control parameter with the greatest decreasing change in Process Window Index (maximum negative slope) is iterated, requiring calculation of each control parameter gradient $f'(C_j)$ to find a search variable at each iteration interval. Without repeating the adjustment of any control parameter value, the control parameter producing the maximum change in feedback parameter may be adjusted until the minimum Process Window Index is reached.

Finding the minimum Process Window Index may not necessarily complete the task of identifying the optimum set of control parameters. If the change in control parameter values from the reference control series is large, any associated errors from approximations in the discontinuous gradients may result in a Process Window Index that does not conform to the expected minimum value. Generally, confidence that a modest changes in several control parameters is preferable to large changes in only a few parameters. As a consequence, a weighting factor or bias may be assigned to a Process Window Index referred to as a "confidence coefficient" $\xi$ dependent on the extent of control parameter adjustment.

One example of a confidence coefficient might be related to a product of the normalized control parameter changes, such as $\xi = \Pi_j \{1 + |C_j - C_j^0|/|C_j^0|\}^q$ for $j=1, \ldots, n$, wherein the confidence coefficient $\xi$ represents the product of the deviations from unity of normalized control parameters with q as a selected exponent with a value such as two. Such a coefficient would typically be greater than or equal to unity, so that if $\xi$ is multiplied by a Process Window Index value S, the resulting Process Window Confidence Product S' would be at least as large as its corresponding Process Window Index S. In an example, a first Process Window Index has a value of $S_1=70$, a second Process Window Index has a value of $S_2=80$, a first confidence coefficient is $\xi_1=1.5$, and a second confidence coefficient is $\xi_2=1.2$. Consequently, the first confidence product $S'_1=\xi_1 S_1=105$, while the second confidence product $S'_2=\xi_2 S_2=96$ being smaller than the first confidence product despite a larger second Process Window Index. Hence, in this example, the second Process Window Index would be preferable to the first. Alternatively, the confidence coefficient could be an added bias term to the Process Window Index, rather than a factor. Other such relations to establish a confidence coefficient will readily suggest themselves to skilled persons in the art and remain within the scope of the present invention.

Figure 6:
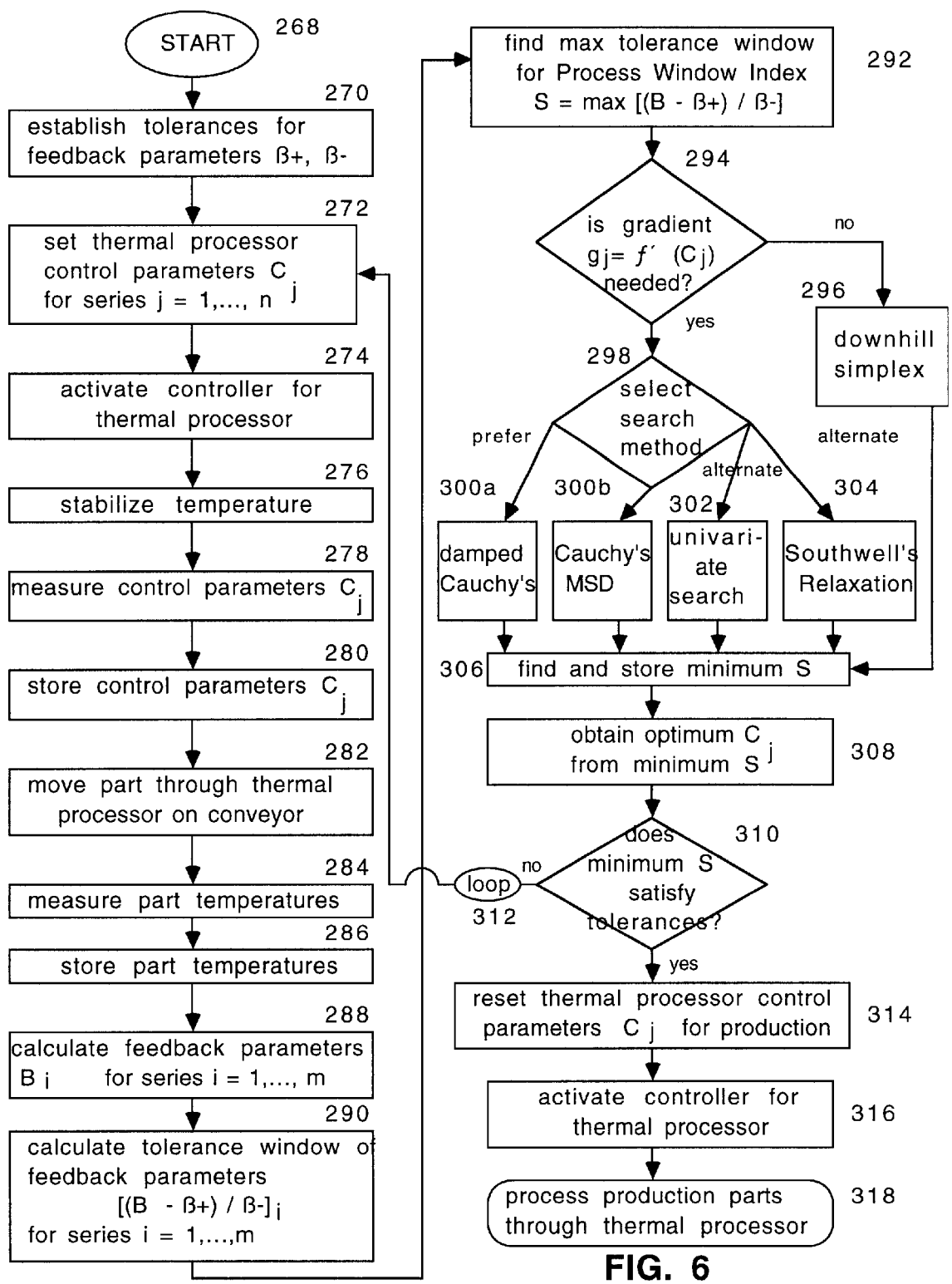
FIG. 6 is a flow-diagram illustrating a procedure used to control a thermal processor in accordance with a presently preferred embodiment of the present invention.

The procedure for optimizing the Process Window Index and using the optimal control parameters for setting the thermal processor conditions may be illustrated in the FIG. 6 flow diagram. The thermal process initiates at a starting condition 268 for processing parts. Tolerances are established 270 from a part manufacturer specification for a series $i=1, \ldots, m$ for m calculated feedback parameters $B_i$, such as midpoint of the a tolerance band $\beta^+_i$ and the band width $\beta^-_i$. The control parameters $C_j$ for a series $j=1, \ldots, n$ are manually set 272 for the thermal processor to create the n control conditions which the part will be subject to. These control parameters include temperatures for the zones, as well as conveyor speed and fan speed. The thermal processor is activated 274 and control temperatures are permitted to stabilize 276. The control parameters are established 278 (by measurement) and stored 280 in a data acquisition system. A part is then conveyed through the thermal processor 282. The part temperature is measured 284 and stored 286 to establish a part temperature profile. From this profile, the feedback parameters $B_i$, are calculated 288, such as peak part temperature within the oven, time above reflow temperature, and maximum temperature rise rate. These feedback parameters are compared to their tolerance bands to calculate their tolerance windows 290. From these comparisons, a maximum tolerance window is determined 292 establishing the Process Window Index S for that set of control parameters.

For optimization, the operator decides whether to implement a minimization search for Process Window Index based on the use of derivatives 294. If not, the downhill simplex method 296 is selected as an alternative embodiment to optimization. If the gradient may be calculated, then a search method 298 may be selected between the preferred damped Cauchy's MSD 300a, or the alternative Cauchy's MSD 300b or univariate search 302 or Southwell's Relaxation 304. The optimization proceeds until a minimum Process Window Index may be found and stored 306. Based on the control parameter set corresponding to the minimum Process Window Index $S_{min}$, the optimum control parameter conditions $C_{jopt}$ may be established 308. A logic test 310 may be performed to determine whether the predicted minimum Process Window Index will satisfy the manufacturer's specification from tolerances 270. If not, the process is repeated in a loop 312 to the thermal process 272. Satisfaction of the specification enables the operator to reset control parameters 314 for production processing. The controller may then be activated 316 and processing initiated for production of parts 318 for optimal compliance with the tolerance specifications.

Figure 7:
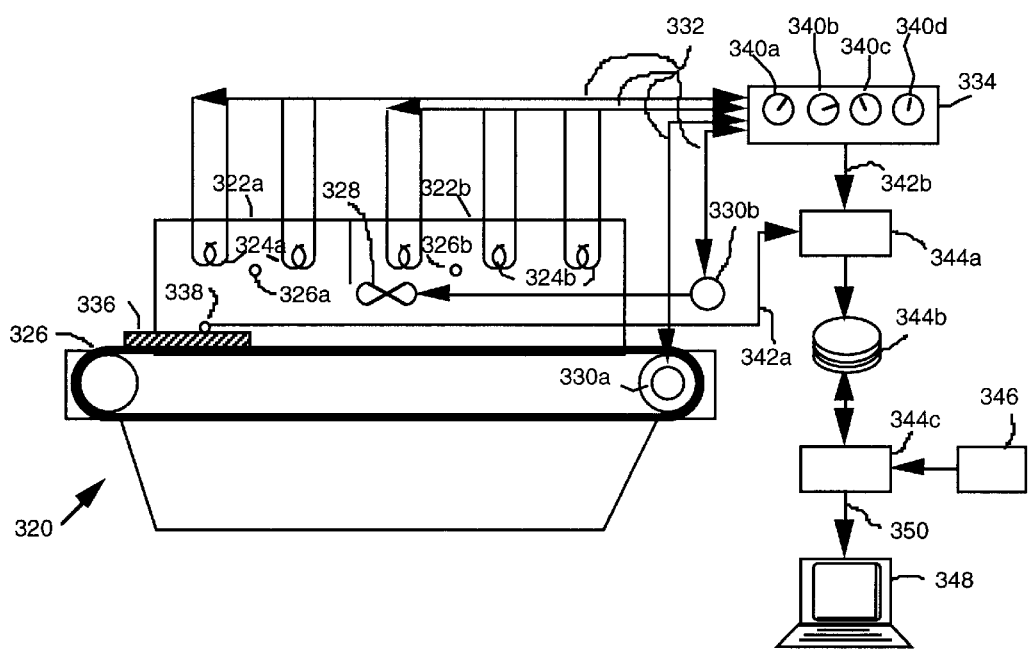
FIG. 7 is a diagram illustrating an apparatus used to control a thermal processor in accordance with a specific embodiment of the present invention.

An apparatus performing the functions described above can be seen in the diagram of FIG. 7 for thermal processing.

The thermal processor 320 depicted as a reflow oven has for this example two zones subject to control. The first zone 322a has heating elements 324a and a second zone 322b has heating elements 324b. In addition, the thermal processor has a conveyor 326 and a recirculating fan 328. The conveyor 326 is powered by a conveyor motor 330a and the fan 328 by a fan motor 330b. The thermostat settings for heating elements 324a and 324b, and the speeds for conveyor motor 330a and fan motor 330b are commanded by a control connector 332 to input from a controller 334. A part 336 with a temperature measurement device 338 is conveyed through the thermal processor 320 on the conveyor 326. Each control parameter is commanded to a target condition by the controller 334 at a control interface. The example shown in FIG. 7 features a first zone interface 340a, a second zone interface 340b, conveyor interface 340c and a fan control 340d. Temperature data are sent from the part's measurement device 338 by data connector 342a as well as signals from the controller 334 by command and feedback connector 342b to a data acquisition system 344a. The data are stored in and retrieved from a data storage device 344b. The data are analyzed in a processing device 344c (which may be the same machine as data acquisition system 344a) to calculate feedback parameters from the part temperature data and compared to tolerance specifications provided from a source 346. The data processor 344c may also calculate the Process Window Index and find the minimum value based on the data collected. The data acquisition system 344a, the data storage and retrieval device 344b, the data processor 344c, or any combination thereof may be replaced by a multi-purpose device. The minimum Process Window Index is correlated to an optimum set of control parameters in the data processor 344c and these optimum control parameters are provided to an operator through a console 348 by a command connector 350.

The methodology for determining calculated feedback parameters and their tolerances, gradients of feedback parameter response to control parameter changes, the Process Window Index based on feedback parameters, minimization of the Process Window Index based on data obtained from the part temperature response to the thermal processor, and determination of the settings for optimum control parameters based on the minimum Process Window Index for adjustment of the controller based on the optimum control parameters may be incorporated and executed in coded form on a variety of computational and/or storage media intended for such purposes as will now be apparent to those of ordinary skill in the art. The corresponding apparatus provides the functionality of finding the minimum Process Window Index and establishing their corresponding optimum control parameter values for optimized thermal processing with minimal iterations of the thermal process. The optimization techniques described may apply to alternate functions related to part temperature response from control parameter alterations conducted for thermal processing.

Maximum Throughput

The optimization procedure for maximum throughput may focus on the highest conveyor speed u able to satisfy the required Process Window Index $S_{req}$, in contrast to a search for the lowest predicted Process Window Index. The algorithm for maximum throughput may select a required Process Window Index $S_{req}$ as a desired target (not to be exceeded), and iterate about ten steps for a given set of control parameters $C_j$ (including u). The iteration procedure may proceed about ten steps using Cauchy's minimization algorithm. The iteration procedure searches for the complimentary control parameters $C_j$ that do not exceed $S_{req}$. The conveyor speed u may then be incrementally increased, and the iteration procedure repeated.

The incremental increase of the conveyor speed and subsequent iteration of the Process Window Index S may continue until S reaches but does not exceed $S_{req}$. If no solution can be found, an error message may be sent to the operator. Such a result suggests that the target value for $S_{req}$ may be physically unattainable by the thermal processor, and a higher value might be considered.

The increments with which to adjust the conveyor speed u may be established in constant units or as a fractional ratio of the conveyor speed value. For example, if conveyor speed may be commanded as twenty inches per second, an increment may be chosen to be 0.1 inch per second (for a change from the initial value of 0.5%). Alternatively, an increment may be chosen to represent a fraction multiplied by the updated conveyor speed.

Figure 8:
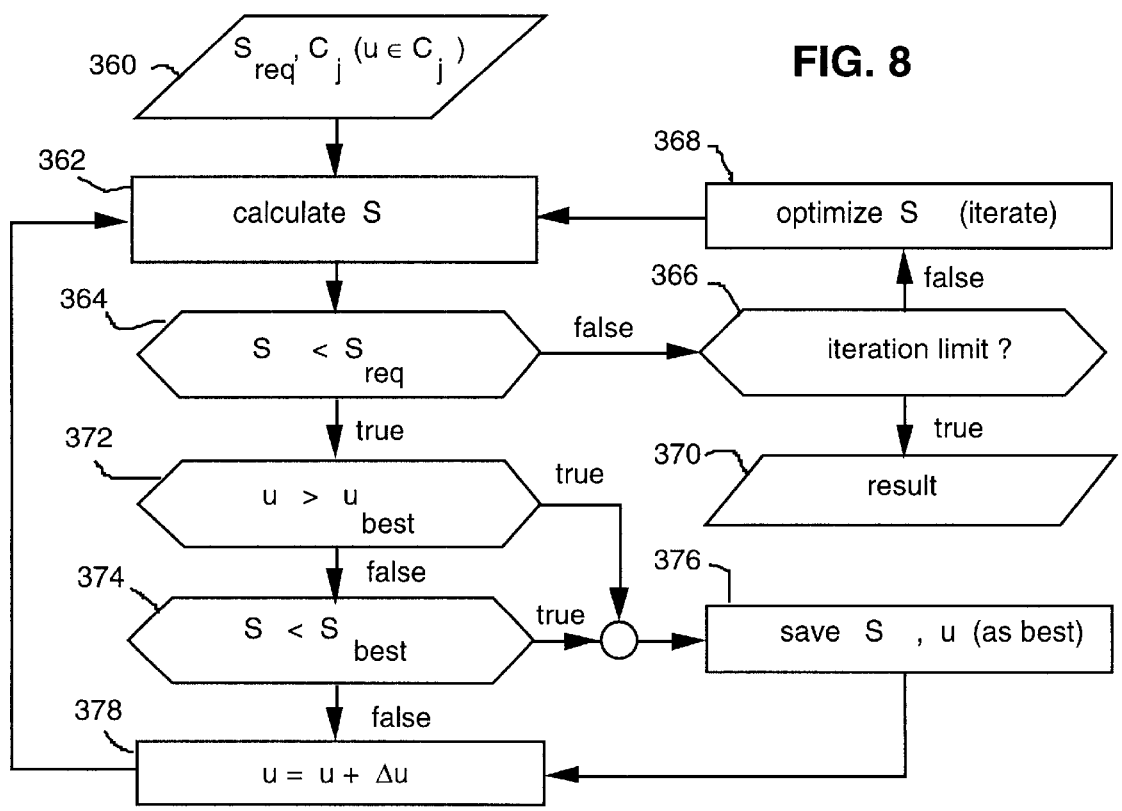
FIG. 8 is a flow-diagram illustrating a procedure used for maximizing throughput in a thermal processor in accordance with a specific embodiment of the present invention.

The flowchart for maximizing throughput may be seen in FIG. 8. Typically, this procedure seeks the highest or best available conveyor speed $u_{best}$ for thermal processing of the part. The optimization procedure may start with an input as 360 including a selected value of required Process Window Index $S_{req}$. The input may also initialize the control series from the multiple oven setpoint conditions $C_j$. The control series may include an initial conveyor speed u as an element within $C_j$. An iterated Process Window Index S may be calculated as 362. The optimization process for associated control parameters may seek minimize the Process Window Index S for maximum conveyor speed $u_{best}$ as a best Process Window Index $S_{best}$.

Next, the procedure queries as 364 whether the iterated Process Window Index S calculated in 362 is less than the required Process Window Index $S_{req}$. If not satisfied, an iteration counter limit may be queried as 366. If the iteration count has not reached the iteration threshold, the Process Window Index S may be optimized in an iterative process as 368 before returning to calculation of the Process Window Index as 362. If the iteration threshold has been reached or exceeded, an output as 370 indicating the final process result may be provided to the operator. The iteration process may incorporate Cauchy's Method of Steepest Descent, damped Cauchy's MSD, Downhill Simplex Method, Conjugate Gradient Method, Southwell's relaxation method or univariate search.

If the Process Window Index query as 364 is satisfied, the procedure may inquire as 372 whether conveyor speed is less than its highest or best value. If not, a further query as 374 may ask whether the iterated Process Window Index S is less than the best Process Window Index $S_{best}$. If either query 372 or 374 is satisfied, the resulting Process Window Index from the latest iteration may be saved in memory as 376. If the query 374 is not satisfied, the conveyor speed u may be increased as 378 by an incremental value Δu and returned to calculating the iterated Process Window Index as 362. This procedure continues until the counted iteration limit as 366 has been reached and the process terminates. The last conveyor speed u for which the Process Window Index requirement is satisfied ($S<S_{req}$) may be used as the highest or best conveyor speed $U_{best}$ for maximizing throughput of parts to be continually processed in the reflow oven or other thermal processor.

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for controlling a thermal processor having a control series from a plurality of control parameters including a conveyor speed as an element in said plurality of control parameters, said method comprising:

setting the control series including the conveyor speed;

acquiring at least one function to correlate between changes in a Process Window Index and changes in the plurality of control parameters;

finding a best Process Window Index that is less than a required Process Window Index;

selecting a maximum throughput control series corresponding to said best Process Window Index, said maximum throughput control series including a maximum conveyor speed; and operating the thermal processor using said maximum throughput control series.

2. A method according to claim 1 wherein said selecting a maximum throughput control series further comprises:

initializing the control series, including the conveyor speed;

calculating an iterated Process Window Index;

optimizing the control series for minimizing said iterated Process Window Index;

incrementally increasing the conveyor speed to produce an incremented conveyor speed;

recalculating said iterated Process Window Index;

saving said iterated Process Window Index as said best Process Window Index and said incremented conveyor speed as said maximum conveyor speed if said iterated Process Window Index is less than said required Process Window Index; and repeating said optimizing, incrementally increasing, recalculating and saving.

3. A method according to claim 2 wherein said selecting a maximum throughput control series further includes:

counting a number of iterations for an iteration count; and terminating said repeating if said iteration count exceeds an iteration threshold.

4. A method according to claim 2 wherein said selecting a maximum throughput control series further includes:

subtracting said iterated Process Window Index corresponding to said incremented conveyor speed from a previous iterated Process Window Index corresponding to a previous conveyor speed to produce an iteration difference; and terminating said repeating if an absolute value of said iteration difference is less than a throughput tolerance.

5. A method according to claim 1 wherein said finding a best Process Window Index further comprises:

positioning a first Process Window Index at a reference control series for a first position;

selecting a step length for a gradient search in said first Process Window Index;

calculating a gradient in said gradient search;

directing a gradient vector from said first position to a second position;

locating a second Process Window Index at said second position along said gradient vector at said distance from said first Process Window Index at said first position;

substituting said first Process Window Index with said second Process Window Index and said first position with said second position; and repeating in sequence said selecting, calculating, directing, locating and substituting until the Process Window Index stops decreasing.

6. A method according to claim 1 wherein said finding a best Process Window Index further comprises:

positioning a first Process Window Index at a reference control series for a first position;

selecting a step length for a gradient search in said first Process Window Index;

determining whether a negative gradient can be found at a distance corresponding to said step length;

searching for a direction from a weighted history summation vector;

directing a vector towards said direction from said first position to a second position;

locating a second Process Window Index at said second position along said vector at said distance from said first Process Window Index at said first position;

substituting said first Process Window Index with said second Process Window Index and said first position with said second position; and repeating in sequence said selecting, determining, searching, directing, locating and substituting until either said first Process Window Index or said second Process Window Index stops decreasing.

7. A method according to claim 5 wherein said directing a gradient vector further comprises:

selecting at least one previous vector;

selecting at least one weighting factor;

scaling said at least one previous vector by said at least one weighting factor to correspondingly produce at least one history vector; and adding said at least one history vector said weighted history summation vector.

8. A method according to claim 1 wherein said finding a Best Process Window Index further comprises:

positioning a plurality of Process Window Index values for a corresponding plurality of reference control parameters to produce a simplex;

calculating the simplex centroid of said simplex;

determining a largest Process Window Index value from said plurality of Process Window Index values;

directing a vector from said largest Process Window Index value towards the simplex centroid;

projecting said vector from the simplex centroid as a projection point to obtain a replacement value;

replacing said largest Process Window Index value with said replacement value; and repeating in sequence said finding, determining, directing, projecting, and replacing until said vector length is within a specified vector tolerance.

9. A method according to claim 1 wherein said finding a best Process Window Index further comprises:

positioning a plurality of Process Window Index values for a corresponding plurality of reference control parameters to produce a simplex;

determining a smallest Process Window Index value from said plurality of Process Window Index values;

directing a plurality of vectors from said plurality of Process Window Index values excluding said smallest Process Window Index value towards said smallest Process Window Index value;

projecting said plurality of vectors to shrink said simplex towards said smallest Process Window Index value; and repeating in sequence said determining, directing, and projecting until said vector length is within a specified vector tolerance.

10. A method according to claim 1 wherein said finding a best Process Window Index further comprises:

positioning a plurality of Process Window Index values for a corresponding plurality of reference control parameters to produce a simplex;

directing a plurality of vectors from said plurality of Process Window Index values towards one another; and repeating said positioning and directing until said plurality of vectors are within a specified length.

11. A method according to claim 1 wherein said finding a best Process Window Index further includes a weighting coefficient based on a difference between an adjustment control parameter value and a reference control parameter value, wherein said weighting coefficient is multiplied by a Process Window Index to produce a Process Window Confidence Product that is substituted for said Process Window Index.

12. A method according to claim 1 wherein said finding a best Process Window Index further comprises:

approximating the derivative of a feedback parameter with respect to a control parameter by a linear difference coefficient whereby a first small change in said feedback parameter divided by a second small change in said control parameter yields said linear difference coefficient; and producing a discretized table from a plurality of linear difference coefficients.

13. A programmable storage device readable by a machine tangibly embodying a program of instructions executable by the machine to perform method steps for controlling a thermal processor having a control series from a plurality of control parameters including a conveyor speed as an element in said plurality of control parameters, said method steps comprising:

calculating a maximum conveyor speed and setting the conveyor speed to said maximum conveyor speed;

acquiring at least one function to correlate between changes in the Process Window Index and changes in the plurality of control parameters;

finding a best Process Window Index that is less than a required Process Window Index;

selecting a maximum throughput control series corresponding to said best Process Window Index; and operating the thermal processor using said maximum throughput control series.

14. A programmable storage device according to claim 13 wherein said calculating a maximum conveyor speed further comprises:

initializing the control series, including the conveyor speed;

calculating an iterated Process Window Index;

optimizing the control series for minimizing said iterated Process Window Index;

incrementally increasing the conveyor speed;

recalculating said iterated Process Window Index;

saving said iterated Process Window Index as said best Process Window Index and the conveyor speed as said maximum conveyor speed if said iterated Process Window Index is less than said required Process Window Index; and repeating said optimizing, incrementally increasing, recalculating and saving.

15. A programmable storage device according to claim 14 wherein said calculating a maximum a maximum conveyor speed further includes:

counting a number of iterations for an iteration count; and terminating said repeating if said iteration count exceeds an iteration threshold.

16. A programmable storage device according to claim 14 wherein said calculating a maximum conveyor speed further includes:

subtracting said iterated Process Window Index corresponding to said incremented conveyor speed from a previous iterated Process Window Index corresponding to a previous conveyor speed to produce an iteration difference; and terminating said repeating if an absolute value of said iteration difference is less than a throughput tolerance.

* * * * *

UNITED STATES PATENT AND TRADEMARK OFFICE
CERTIFICATE OF CORRECTION

PATENT NO.      : 6,470,239 B1
DATED           : October 22, 2002
INVENTOR(S)     : Steven Arthur Shultz and Philip C. Kazmierowicz It is certified that error appears in the above-identified patent and that said Letters Patent is hereby corrected as shown below:

Column 8,
Line 10, replace the second occurrence of the symbol "$\Sigma$" with -- $\forall$ --

Column 11,
Line 2, replace "f" with -- $f$ --

Column 13,
Line 42, replace "f" with -- $f$ --

Column 16,
Line 60, replace "U" with -- u --

Signed and Sealed this

Twenty-second Day of April, 2003

JAMES E. ROGAN
*Director of the United States Patent and Trademark Office*